A. J. DILLEY.

SPRING.

APPLICATION FILED DEC. 1, 1916.

Reissued July 24, 1917.

14,330.

INVENTOR
Arzeno J. Dilley
BY
Howard P. Denison
ATTORNEY.

UNITED STATES PATENT OFFICE.

ARZENO J. DILLEY, OF MUIR, MICHIGAN, ASSIGNOR OF ONE-HALF TO FRED W. GREEN, OF IONIA, MICHIGAN.

SPRING.

14,330. Specification of Reissued Letters Patent. Reissued July 24, 1917.

Original No. 1,137,845, dated May 4, 1915, Serial No. 751,753, filed March 3, 1913. Application for reissue filed December 1, 1916. Serial No. 134,328.

*To all whom it may concern:*

Be it known that I, ARZENO J. DILLEY, a citizen of the United States, and resident of Muir, in the county of Ionia, in the State of Michigan, have invented new and useful Improvements in Springs, of which the following, taken in connection with the accompanying drawings, is a full, clear, and exact description.

My invention relates to an improvement in springs, and more particularly to that class of springs used upon vehicles which consists of a number of leaves.

The object is to construct the leaves in such a manner that a lubricant can be introduced between the leaves to prevent the spring from squeaking.

With the spring that is generally used, it is necessary to raise or jack the car so that the leaves of the spring can be pried apart for the purpose of introducing a lubricant therebetween. The lubricant will prevent squeaking and will keep the spring from crystallizing. A spring which can be lubricated will ride much smoother and will not rust between the leaves, and will last much longer, doing away with the friction and squeaking between the leaves.

The invention consists of certain novel features of construction and combinations of parts which will be hereinafter more fully described and pointed out in the claims.

Figure 1:
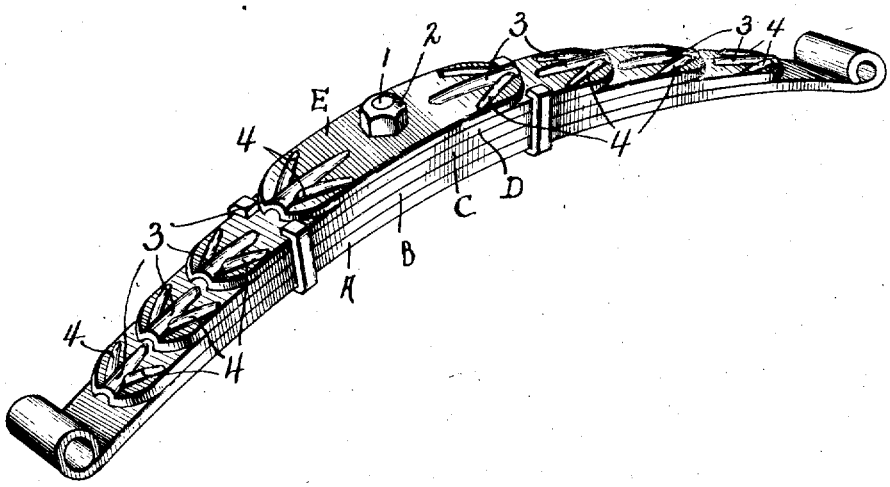
Figure 2:
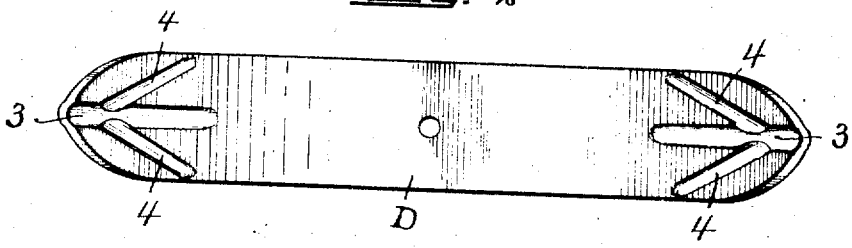
Figure 3:
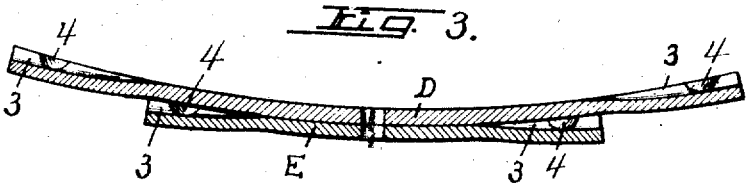

In the accompanying drawings:—Figure 1 is a perspective view of the invention; and Fig. 2 is a plan view of the leaves taken from the under or inner side thereof. Fig. 3 is a longitudinal sectional view.

The spring consists of a plurality of leaves, A, B, C, D, and E. The several leaves are connected together by any suitable means, such as a bolt 1, and nut 2. The leaves B, C, D and E are all mounted upon the main leaf A, and leaves B, C, D and E are all provided with a longitudinal or main corrugation or duct 3 extending externally from the spring. The duct or corrugation 3 extends preferably longitudinally of the leaf from the outer end thereof. Extending radially from the longitudinal corrugation or duct 3 of each leaf of the leaves B, C and D are radial ducts or corrugations —4— likewise extending externally from the spring. These ducts terminate at the outer side edges of the leaves, the depth of the ducts —3— and —4— diminishing in size throughout their entire lengths;—that is, the ducts are of greater depth at their juncture than at their outer ends.

The provision of grooves or ducts at the outer ends of the several leaves permits the oil or lubricant being introduced through the main duct and radial ducts at all times. It makes no difference what load may be placed upon the spring, the lubricant can always be introduced between the leaves without the necessity of prying the leaves apart, and the lubricant will be conducted by the grooves to the wearing surfaces of the leaf, and thereby relieve the friction and rusting of the leaves. Springs which can be lubricated in this manner will be prevented from squeaking and the springs will ride much smoother, as they will be more pliable than they would be if allowed to work and rub together dry.

The juncture of the ducts together with the ducts —4— and the portion of duct —3— radiating inwardly from the juncture constitutes a recess or series of recesses for receiving a lubricant, a marginal portion surrounding the recess or recesses bearing upon an adjacent longer leaf and forming a retaining wall for the lubricant, the continuity of said wall being interrupted by the portion of duct —3— leading from the juncture of the ducts to the end of the spring for conveying lubricant to the recess or recesses.

The struck-up portion constituting the ducts or recesses is formed adjacent the ends of any or all the leaves of a spring and clears the adjacent shorter leaf.

Although I have shown and described one particular construction of spring and form and relation of the parts constituting the invention here, I do not desire to limit myself to the same as various changes may be made in the form and in the details of construction and relation of the parts without departing from the spirit of this invention as set forth in the appended claims.

What I claim as new and desire to secure by Letters Patent is;—

1. Springs for vehicles comprising two or more leaves of varying lengths superimposed and held together, the protruding ends only of said leaves having each a duct stamped therein, the outer end of each of said ducts open at the end of the leaf to receive lubricant without the necessity of separating the leaves.

2. A spring comprising a plurality of leaves having depressions stamped in the ends thereof to produce pockets for a lubricant, said pockets opening at the ends of the leaves for forming a passage for the introduction of a lubricant.

3. A spring comprising a plurality of leaves having a main and radial grooves or corrugations stamped on the under side thereof, and at the ends, said main groove opening at the end of the leaf, and the radial grooves leading from the main groove to the edges of the leaf.

4. In a leaf spring, a leaf having a struck-up portion adjacent to the free end thereof, said struck-up portion extending externally from the spring and forming a lubricant-containing pocket.

5. In a leaf spring, a leaf having a struck-up portion adjacent to the free end thereof, said struck-up portion extending externally from the spring and forming a lubricant-containing pocket and a duct for conveying lubricant to the recess.

6. In a leaf spring, a leaf having a struck-up portion adjacent to the free end thereof, said struck-up portion extending externally from the spring and forming a lubricant-containing pocket and a duct extending from the recess to the end of the leaf for conveying lubricant to the recess.

ARZENO J. DILLEY.

Witnesses:
A. L. HARRIS,
A. C. COHEN.